United States Patent
Kimpara et al.

(10) Patent No.: US 11,015,501 B2
(45) Date of Patent: May 25, 2021

(54) BREATHER CHAMBER STRUCTURE AND ENGINE

(71) Applicant: SUZUKI MOTOR CORPORATION, Hamamatsu (JP)

(72) Inventors: Masatoshi Kimpara, Hamamatsu (JP); Saki Nozue, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 16/671,918

(22) Filed: Nov. 1, 2019

(65) Prior Publication Data

US 2020/0208554 A1 Jul. 2, 2020

(30) Foreign Application Priority Data

Dec. 26, 2018 (JP) .............................. JP2018-242803

(51) Int. Cl.
  *F01M 13/04* (2006.01)
  *F02B 61/04* (2006.01)
  *B63H 20/00* (2006.01)
  *B01D 45/04* (2006.01)
  *F01M 13/00* (2006.01)

(52) U.S. Cl.
  CPC ............. *F01M 13/04* (2013.01); *B01D 45/04* (2013.01); *B63H 20/002* (2013.01); *F02B 61/045* (2013.01); *F01M 2013/005* (2013.01); *F01M 2013/045* (2013.01)

(58) Field of Classification Search
  CPC ............. F01M 13/04; F01M 2013/005; F01M 2013/045; B01D 45/04; B63H 20/002; F02B 61/045

USPC ....................................................... 123/198 E
See application file for complete search history.

(56) References Cited

U.S. PATENT DOCUMENTS

| 4,993,375 | A | * | 2/1991 | Akihiko | ............. F01M 13/0416 |
| | | | | | 123/195 C |
| 2008/0245321 | A1 | * | 10/2008 | Ishizaka | ................. F01M 13/04 |
| | | | | | 123/41.86 |
| 2020/0025048 | A1 | * | 1/2020 | Konishi | ............. F01M 13/0416 |

FOREIGN PATENT DOCUMENTS

JP  2001-63691 A  3/2001

* cited by examiner

*Primary Examiner* — Joseph J Dallo
*Assistant Examiner* — Yi-Kai Wang
(74) *Attorney, Agent, or Firm* — Stein IP, LLC

(57) ABSTRACT

There is provided a breather chamber structure. An inner wall partitions a breather space surrounded by outer walls into a plurality of chambers including a first chamber, a second chamber, and a third chamber. An inlet allows the gas to flow into the first chamber. A first communication path communicates between the first chamber and the second chamber. A second communication path communicates between the second chamber and the third chamber. An outlet allows the gas in the third chamber to flow out of the breather space. An oil discharge port is configured to return oil separated from gas in the breather space to an oil reservoir. The third chamber has a volume equal to or greater than half of a volume of the breather space. The first chamber has a volume larger than a volume of any of the chambers except for the first and third chambers.

9 Claims, 10 Drawing Sheets

BREATHER CHAMBER STRUCTURE AND ENGINE

CROSS-REFERENCE TO RELATED APPLICATIONS

The disclosure of Japanese Patent Application No. 2018-242803 filed on Dec. 26, 2018, including specification, drawings and claims is incorporated herein by reference in its entirety.

TECHNICAL FIELD

The present disclosure relates to a breather chamber structure of an engine and an engine including a breather chamber structure.

BACKGROUND

In a 4-stroke engine, a breather chamber has a function of preventing engine oil from flowing to the outside together with gas in a crank chamber when the gas is discharged to the outside to lower the pressure in the crank chamber.

Most of the breather chambers includes a plurality of small chambers divided in the breather chamber, and pass the gas in the crank chamber to the small chambers, and separate the oil from the gas using pressure change of the gas generated at that time. Further, an oil discharge port configured to return oil separated from the gas to an oil pan or the like of the engine from the breather chamber is formed on the breather chamber.

The following Patent Document 1 describes a breather chamber in a 4-stroke engine of an outboard motor.

Patent Document 1: Japanese Patent Application Publication No. 2001-063691 A

In a breather chamber described in Patent Document 1, an inside of the breather chamber is partitioned into a large number of small chambers, and a complex flow path of gas is formed in the breather chamber. With this configuration, a number of times of gas compression and expansion is increased to enhance an oil separation effect.

However, if a large number of small chambers are formed in the breather chamber and the flow path of the gas is complicated, the oil separated from the gas adheres to wall surfaces of the small chambers, and the oil is unlikely to be discharged from the breather chamber through the oil discharge port. Due to repetition of a positive pressure and a negative pressure caused by reciprocating motion of the piston of the engine, the oil adhering to the wall surfaces or the like of the small chambers may move in the breather chamber in a direction different from a direction in which the oil discharge port is present, and may flow out of from an outlet port of the gas in the breather chamber.

Further, increase in the number of the small chambers or complication of the flow path of the gas in the breather chamber may increase the size of the breather chamber or the weight of the breather chamber, which may cause increase in the size or the weight of the engine.

SUMMARY

It is at least one of objects of the present disclosure to provide a breather chamber structure and an engine capable of enhancing an oil separation effect with a simple structure.

According to an aspect of embodiments of the present disclosure, there is provided a breather chamber structure configured to separate oil from gas in an engine, the breather chamber structure comprising: front, rear, upper, lower, left and right outer walls; an inner wall that partitions a breather space surrounded by the outer walls into a plurality of chambers including a first chamber, a second chamber, and a third chamber;

an inlet configured to allow the gas to flow into the first chamber; a first communication path that communicates between an inside of the first chamber and an inside of the second chamber; a second communication path that communicates between the inside of the second chamber and an inside of the third chamber; an outlet configured to allow the gas in the inside of the third chamber to flow out of the breather space; and an oil discharge port configured to return the oil separated from the gas in the breather space to an oil reservoir of the engine, wherein the third chamber has a volume equal to or greater than half of a volume of the breather space, and the first chamber has a volume larger than a volume of any of the plurality of chambers except for the first chamber and the third chamber.

According to another aspect of embodiments of the present disclosure, there is provided an engine comprising a cylinder head cover in which the above-described breather chamber structure is formed.

With the above configuration, it is possible to enhance an oil separation effect with a simple structure.

DETAILED DESCRIPTION OF THE EMBODIMENTS

Figure 1:
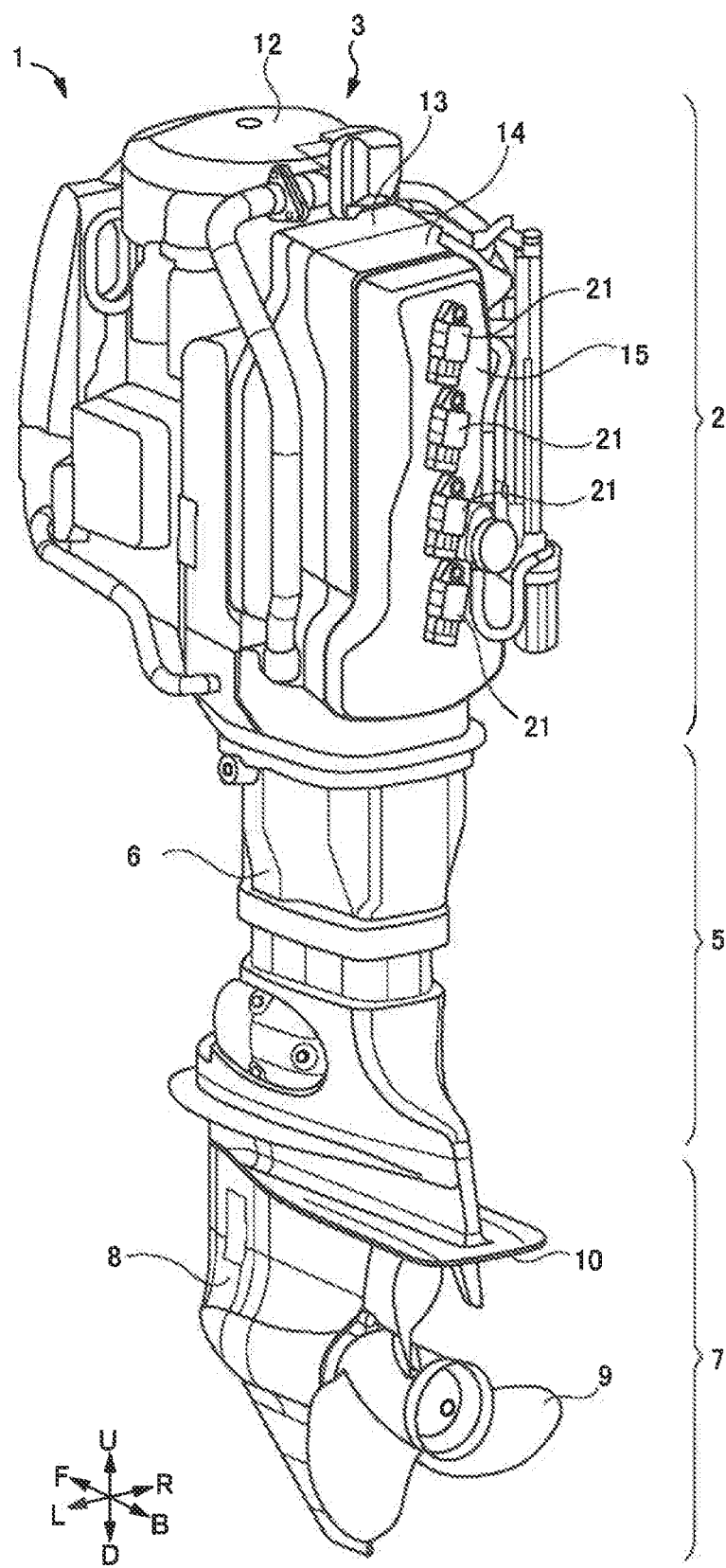
FIG. 1 is a perspective view showing an outboard motor including an engine having a breather chamber structure according to an embodiment of the present disclosure.

A breather chamber structure according to an embodiment of the present disclosure includes: front, rear, upper, lower, left and right outer walls; an inner wall that partitions a breather space surrounded by the outer walls into a plurality of chambers including a first chamber, a second chamber, and a third chamber; an inlet configured to allow gas to flow into the first chamber; a first communication path that communicates between an inside of the first chamber and an inside of the second chamber; a second communication path that communicates between the inside of the second chamber and an inside of the third chamber; an outlet configured to allow the gas in the inside of the third chamber to flow out of the breather space; and an oil discharge port configured to return oil separated from the gas in the breather space to the oil reservoir of the engine.

Further, in the breather chamber structure according to the embodiment of the present disclosure, the third chamber has a volume equal to or greater than half of a volume of the breather space, and the first chamber has a volume larger than a volume of any of the plurality of chambers except for the first chamber and the third chamber.

In the breather chamber structure according to the embodiment of the present disclosure, the volumes of the third chamber and the first chamber are both larger than the volume of the second chamber. Therefore, when a pressure change occurs in an engine (in a crank chamber, in a cam chamber communicating with the crank chamber, or the like) due to reciprocating motion of a piston of the engine or the like, assuming that a temperature of the gas in the first chamber, the second chamber, and the third chamber is constant, according to Boyle's law (pressure× volume=constant), a pressure in the second chamber is higher than pressures in the first chamber and the third chamber. As a result, when the pressure in the engine increases, the gas moving from the inside of the first chamber into the second chamber is compressed, and the gas moving from the inside of the second chamber into the third chamber is expanded. When the pressure in the engine decreases, the gas moving from the inside of the third chamber into the second chamber is compressed, and the gas moving from the inside of the second chamber into the first chamber is expanded. As described above, according to the breather chamber structure, compression and expansion of the gas flowing through the breather space can be caused by pressure change in the engine due to reciprocating motion of the piston or the like, and an effect of separating the oil from the gas can be enhanced.

In addition, according to the breather chamber structure, a number of chambers in the breather space can be reduced, and the structure of the breather chamber can be prevented from becoming complicated. By reducing the number of chambers in the breather space and simplifying the breather chamber structure, it is possible to smoothly flow the oil separated from the gas and adhering to the wall surfaces of the chambers toward the oil discharge port. Further, by reducing the number of chambers in the breather space and simplifying the breather chamber structure, it is possible to reduce the size or the weight of the breather chamber structure.

The engine according to the embodiment of the present disclosure includes a cylinder head cover having such breather chamber structure with reduced size or weight. As a result, it is possible to reduce the size or the weight of the engine.

Embodiments

An embodiment of the breather chamber structure will be described below. In the following description, when front (F), rear (B), up/upper (U), down/lower (D), left (L), and right (R) directions regarding the structure or operation of the breather chamber structure are described, follow arrows shown under the drawings.

FIG. 1 shows an outboard motor including an engine having a breather chamber structure according to an embodiment of the present disclosure. As shown in FIG. 1, an upper unit 2 of an outboard motor 1 is provided with an engine 3. Although the upper unit 2 is provided with an engine cover that covers the engine 3, FIG. 1 shows a state in which the engine cover is removed for convenience of description. A middle unit 5 of the outboard motor 1 is provided with a drive shaft housing 6 that houses a drive shaft that transmits power of the engine 3 to a transmission mechanism or the like. A lower unit 7 of the outboard motor 1 is provided with a gear case 8 that houses a transmission mechanism, a propeller shaft, and the like. The lower unit 7 is provided with a propeller 9, an anti-ventilation plate 10, and the like.

Figure 2:
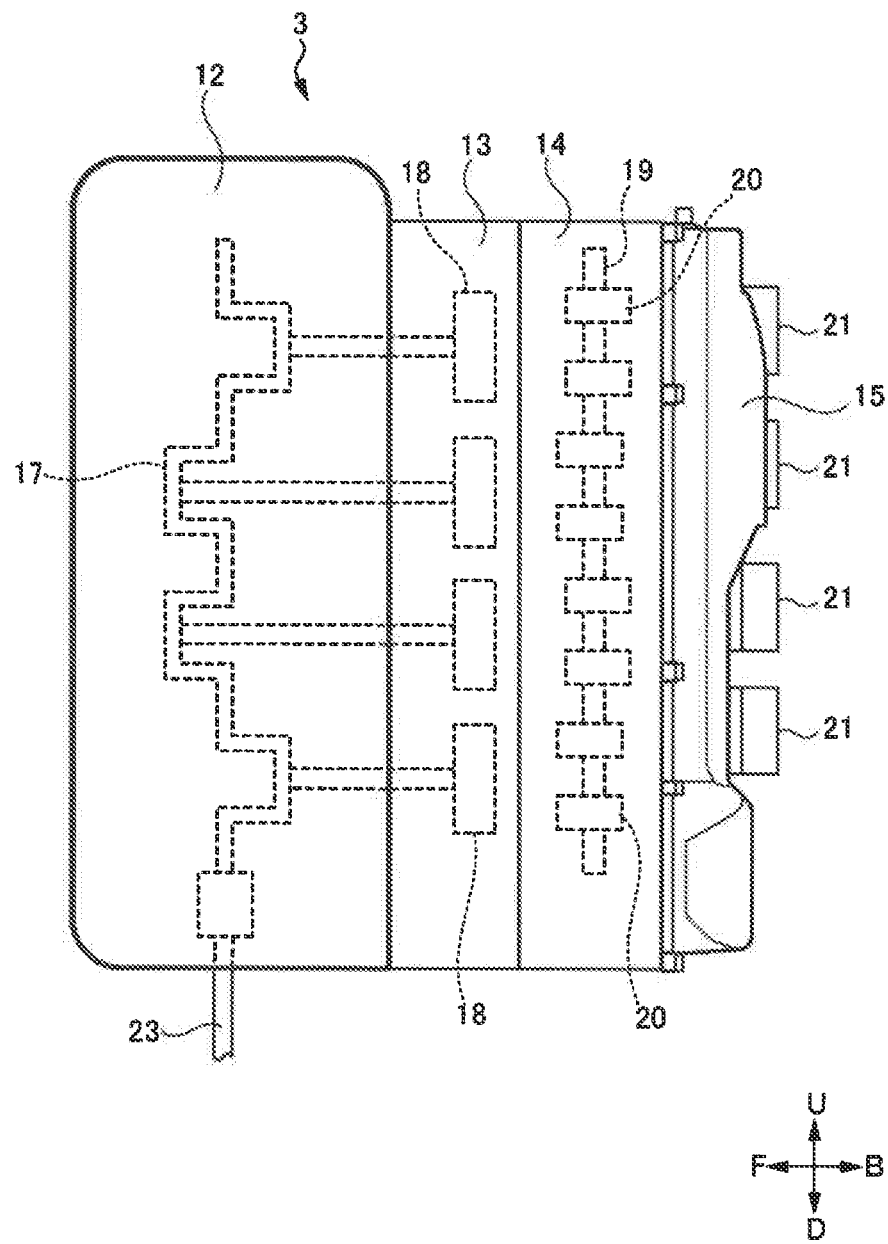
FIG. 2 is an explanatory view showing the engine having the breather chamber structure according to the embodiment of the present disclosure.

FIG. 2 schematically shows the engine 3 of the outboard motor 1. As shown in FIG. 2, the engine 3 is a 4-stroke engine, and includes a crankcase 12, a cylinder block 13, a cylinder head 14, and a cylinder head cover 15. A crank shaft 17 is provided in a crank chamber formed inside the crankcase 12. A piston 18 is provided in each cylinder of the cylinder block 13. A camshaft 19, a cam 20, and the like are provided in a cam chamber formed inside the cylinder head 14. The camshaft 19 is connected to the crankshaft 17 via a chain or belt (not shown). Ignition cons 21 that supply a high voltage to spark plugs (not shown) are attached to the cylinder head cover 15. The spark plugs are provided in the cylinder head 14 and face a combustion chamber.

The engine 3 is disposed such that an axis of the crankshaft 17 extends in an upper-lower direction. A lower end side of the crankshaft 17 is connected to a drive shaft 23. The cylinder block 13 is disposed behind the crankcase 12, the cylinder head 14 is disposed behind the cylinder block 13, and the cylinder head cover 15 is attached to a rear portion of the cylinder head 14. For example, the engine 3 is an inline 4-cylinder engine, in which four cylinders of the cylinder block 13 are arranged in a line in the upper-lower direction, and the camshaft 19 extends in the upper-lower direction as well. In accordance with arrangement of the cylinders, four spark plugs are also arranged in a line in the upper-lower direction, and four ignition coils 21 are also arranged in a line in the upper-lower direction.

Figure 3:
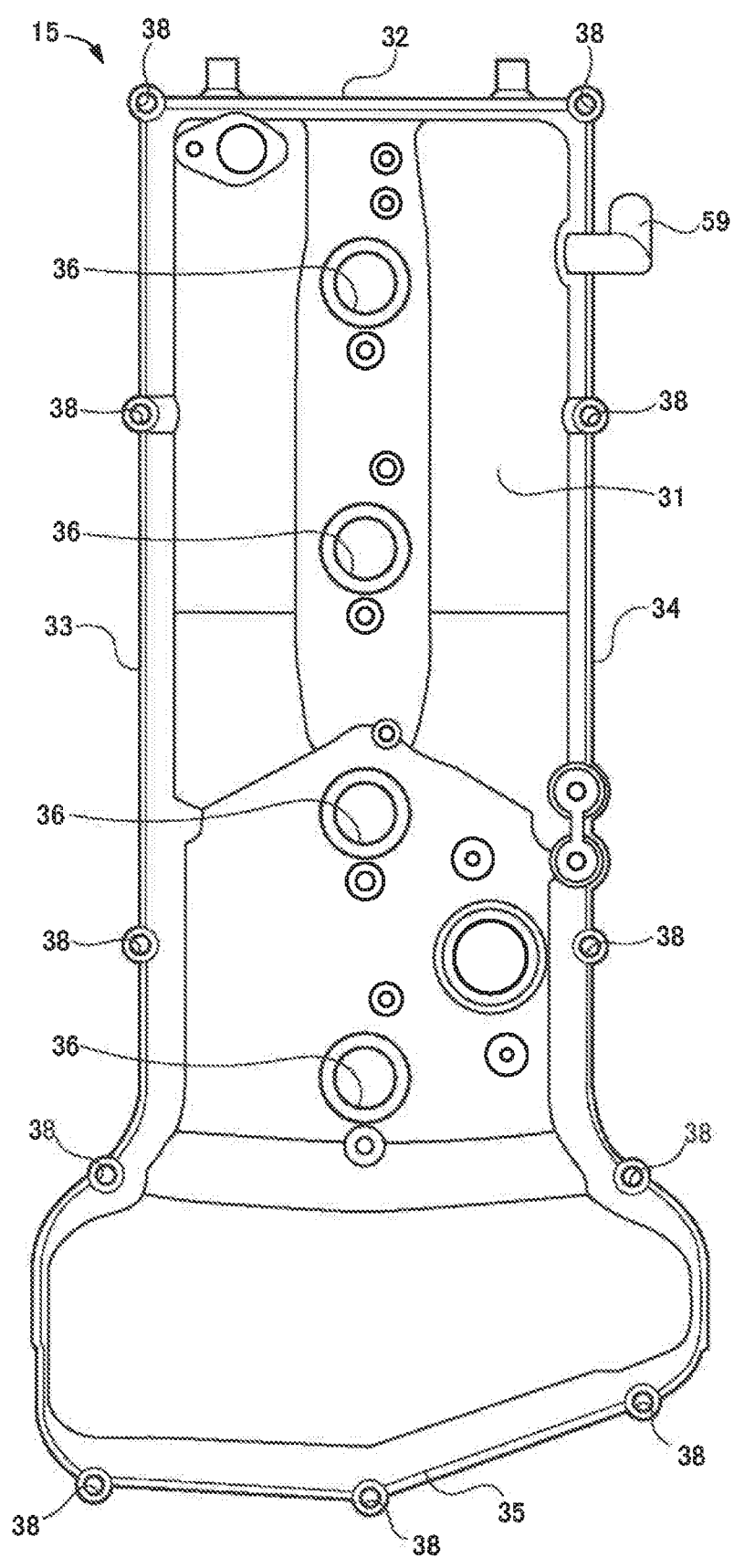
FIG. 3 is an explanatory view showing a front side of a cylinder head cover having the breather chamber structure according to the embodiment of the present disclosure.
Figure 4:
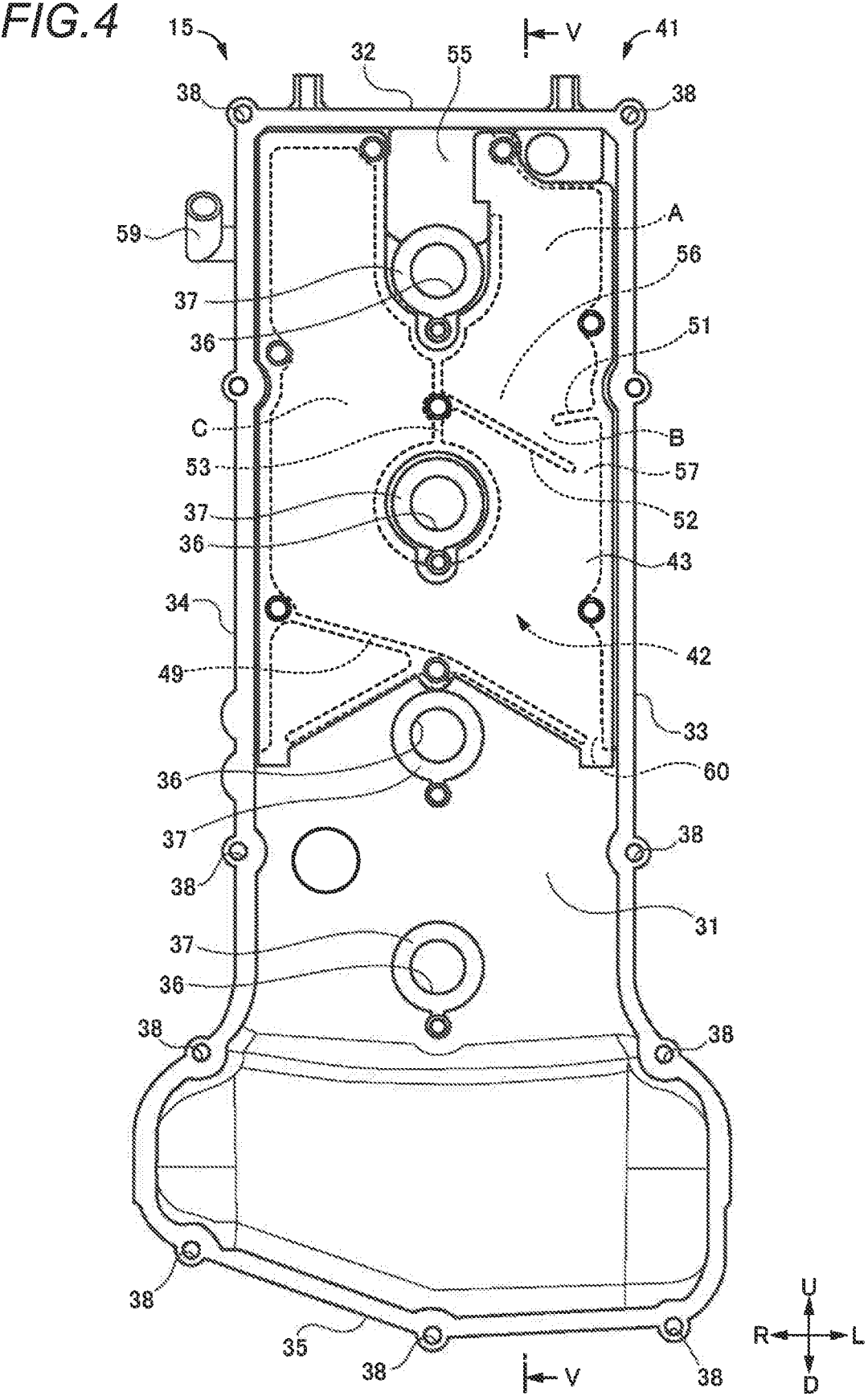
FIG. 4 is an explanatory view showing the breather chamber structure according to the embodiment of the present disclosure.
Figure 5:
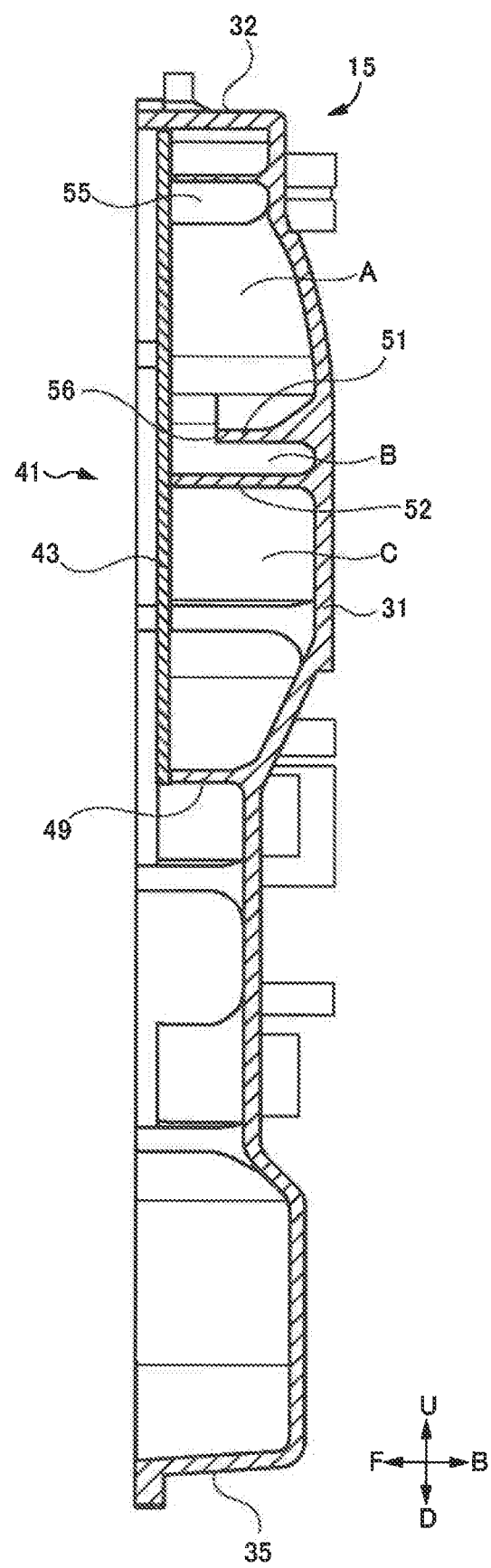
FIG. 5 is a cross-sectional view showing the breather chamber structure as viewed from a direction of arrow V-V in FIG. 4.
Figure 6:
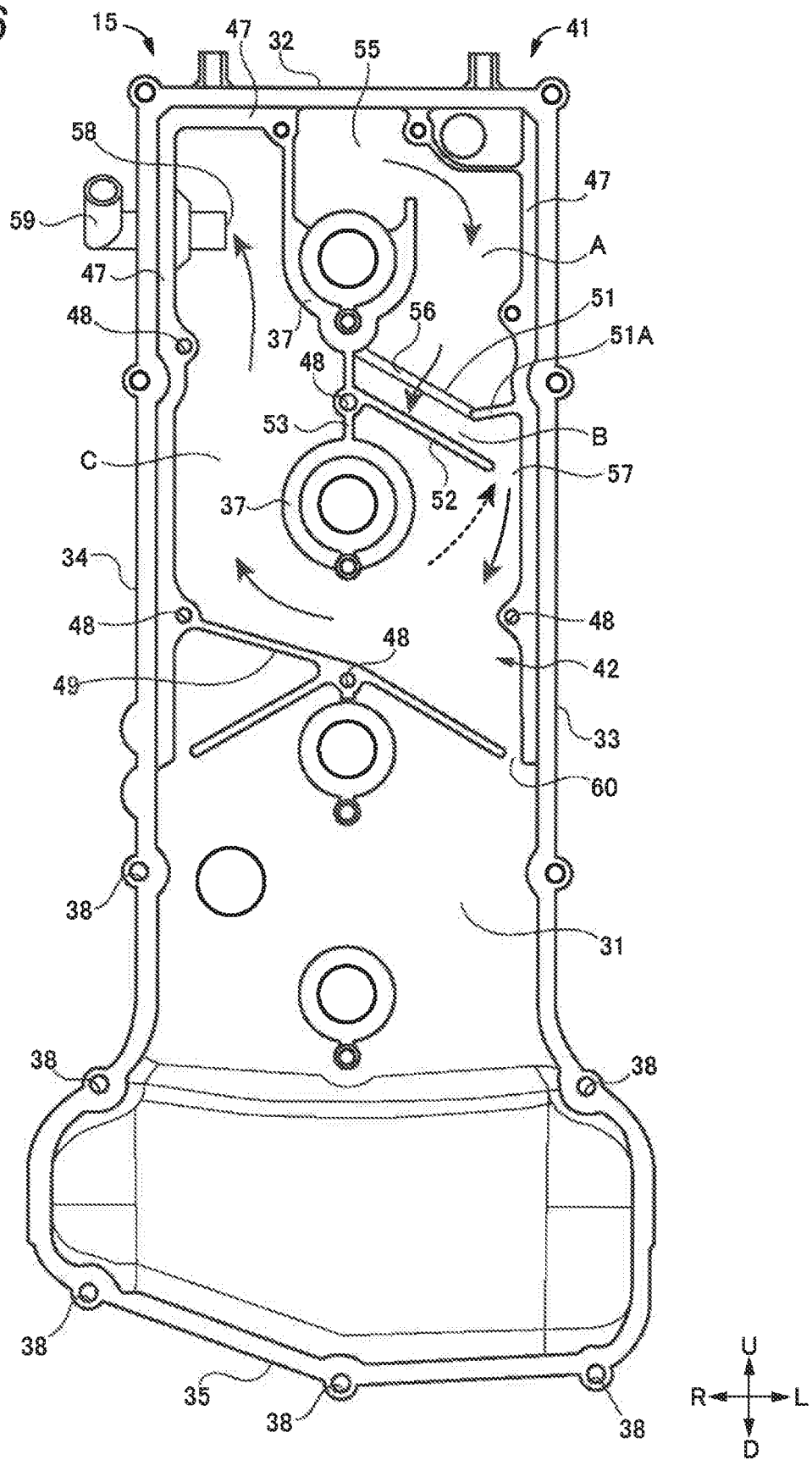
FIG. 6 is an explanatory view showing a state in which a partition plate is removed from the breather chamber structure in FIG. 4.
Figure 7:
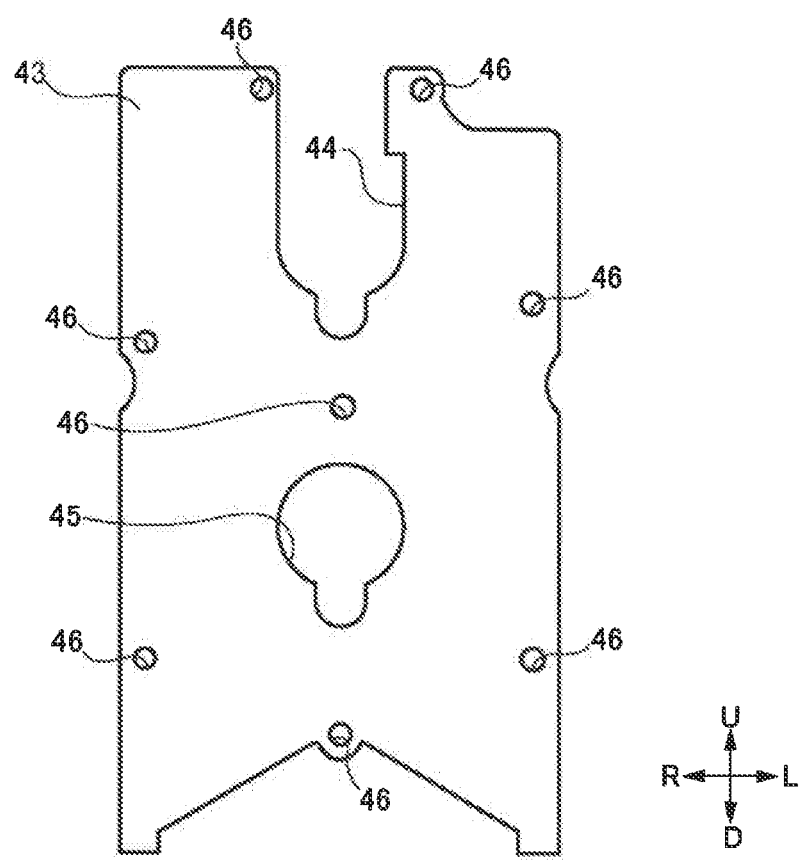
FIG. 7 is an explanatory view showing a partition plate in the breather chamber structure of the embodiment of the present disclosure.
Figure 8:
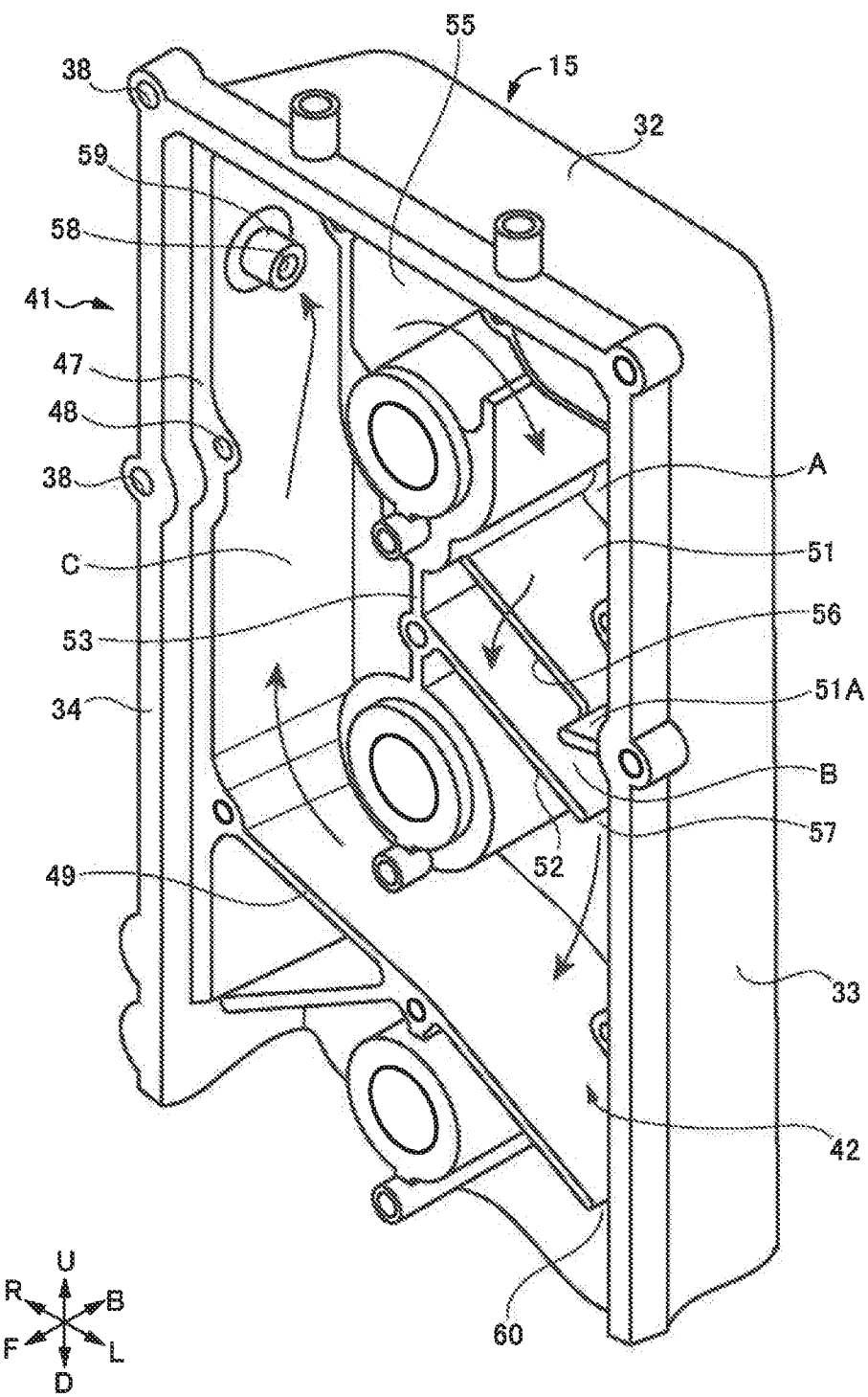
FIG. 8 is a perspective view showing the breather chamber structure of the embodiment of the present disclosure in which the partition plate is removed as viewed from an upper left side.

FIG. 3 shows a front side of the cylinder head cover 15. FIG. 4 shows a rear side of the cylinder head cover 15. FIG. 5 shows a cross section of the cylinder head cover 15 as viewed from a direction of arrow V-V in FIG. 4. FIG. 6 shows a rear side of the cylinder head cover 15 in a state where a partition plate 43 is removed. FIG. 7 shows the partition plate 43. FIG. 8 shows a state in which the breather chamber structure 41 provided in the cylinder head cover 15 is viewed from an upper left side. In FIG. 8, a state in which the partition plate 43 is removed from the cylinder head cover 15 is shown.

As shown in FIG. 3, the cylinder head cover 15 is made of, for example, a metal material. The cylinder head cover 15 has a rear outer wall 31, an upper outer wall 32, a left outer wall 33, a right outer wall 34, and a lower outer wall 35. As shown in FIGS. 4 and 5, the cylinder head cover 15 is formed in a dish shape or a bowl shape that is long in the upper-lower direction, whose front side is opened. As shown in FIG. 4, four spark plug insertion holes 36 into which the spark plug are inserted and attached are formed at a center portion in a left-right direction of the rear outer wall 31 of the cylinder head cover 15. A cylindrical spark plug accommodating portion 37 protruding forward from a front surface of the rear outer wall 31 is provided at a peripheral portion of each spark plug insertion hole 36. A rear portion of the spark plug inserted into each spark plug insertion hole 36 is surrounded by the spark plug accommodating portion 37. Insertion holes 38 that allow fixing members (for example, a bolt) that fix the cylinder head cover 15 to the cylinder head 14 to pass through are provided on the upper outer wall 32, the lower outer wall 35, the left outer wall 33, and the right outer wall 34 of the cylinder head cover 15.

As shown in FIG. 4, the cylinder head cover 15 is provided with a breather chamber structure 41 configured to separate oil from gas in the engine 3 including a blow-by gas. The breather chamber structure 41 has front, rear, upper, lower, left, and right outer walls, and a breather space 42 surrounded by these outer walls. In this embodiment, the rear, upper, left, and right outer walls of the breather chamber structure 41 are respectively formed by an upper portion of the rear outer wall 31, the upper outer wall 32, an upper portion of the left outer wall 33, and an upper portion of the right outer wall 34 of the cylinder head cover 15.

The front outer wall of the breather chamber structure 41 is formed by the partition plate 43. As shown in FIG. 7, the partition plate 43 is formed in a plate shape with, for example, a metal material. A notch 44 having a function of forming an inlet of the breather space 42 and a function of allowing one of the spark plug accommodating portions 37 to pass through is formed on an upper portion of a center portion in the left-right direction of the partition plate 43. An insertion hole 45 that allows another one of the spark plug accommodating portions 37 to pass through is inserted is formed at the central portion of the partition plate 43. Mounting holes 46 that allow fixing members (for example, rivets, screws, or the like) for attaching the partition plate 43 to the cylinder head cover 15 is formed on a peripheral portion of the partition plate 43. As shown in FIG. 6, stepped portions 47 each having a surface recessed by one step from front end surfaces of the outer walls 32 to 34 are respectively formed on the front end side of the upper outer wall 32, the front end side of the upper portion of the left outer wall 33, and the front end side of the upper portion of the right outer wall 34 of the cylinder head cover 15, and fixing holes 48 are formed on surfaces of the stepped portions 47. Fixing holes 48 are also formed on front end surfaces of a boundary wall 49 and a third partition wall 53. The partition plate 43 is mounted on the stepped portions 47, and is attached to the cylinder head cover 15 by respectively passing the fixing members through the mounting holes 46 so as to fix the fixing members to the fixing holes 48.

As shown in FIGS. 4 and 5, the lower outer wall of the breather chamber structure 41 is formed by the boundary wall 49. The boundary wall 49 is disposed substantially at a center portion in the upper-lower direction of the rear outer wall 31 of the cylinder head cover 15, and protrudes forward from the outer wall 31 to the partition plate 43. The boundary wall 49 extends from the right outer wall 34 toward the left outer wall 33 of the cylinder head cover 15.

Figure 9:
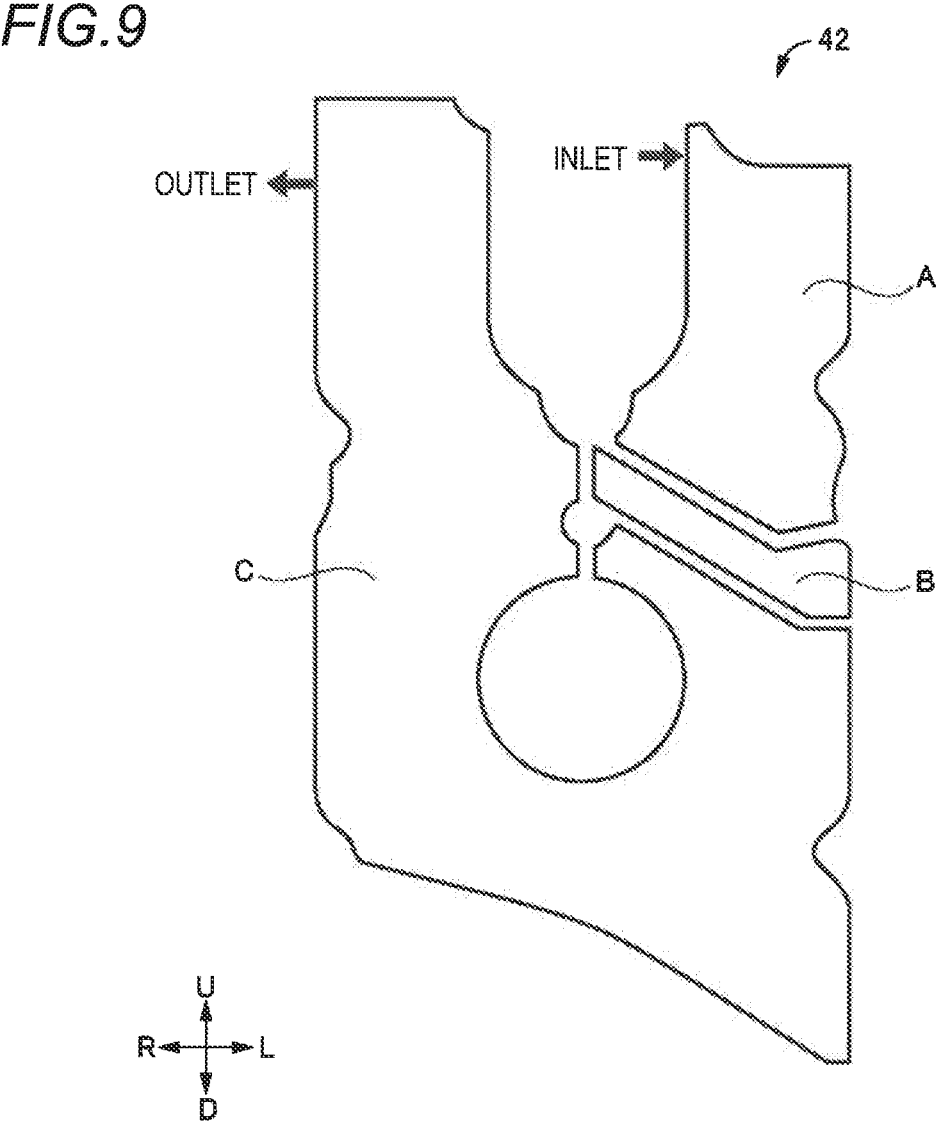
FIG. 9 is an explanatory view showing chambers in the breather chamber structure of the embodiment of the present disclosure.

The breather space 42 is divided into three chambers, i.e. a chamber A as the first chamber, a chamber B as the second chamber, and a chamber C as the third chamber, by the first to third partition walls 51, 52, and 53. Here, FIG. 9 shows a state in which the breather space 42 divided into the chamber A, the chamber B, and the chamber C is viewed from the front. As shown in FIG. 9, the chamber A is a chamber provided with an inlet that allows the gas in the engine 3 to flow in. The chamber C is a chamber provided with an outlet that allows the gas to flow from the inside of the breather space 42 to the outside of the breather space 42.

An arrangement relationship of the chambers A, B, and C will be described following the arrows shown under FIG. 9. Note that the left and right directions in the drawing are opposite to the left and right directions in the description. The chamber A is disposed on the upper left side of the breather space 42. The chamber B is disposed on the left side of the breather space 42, and is disposed below the chamber A so as to be adjacent to the chamber A. The chamber C is formed in an entire region in the upper-lower direction on a lower left side and the right side of the breather space 42. The chamber C has a substantially L shape when the breather space 42 is viewed from the front. A right upper portion of the chamber C and the chamber A are arranged to be adjacent to each other in the horizontal direction (the left-right direction), and a center portion in the upper-lower direction on the right side of the chamber C and the chamber B are arranged to be adjacent to each other in the horizontal direction (the left-right direction). A left portion of the chamber C is disposed below the chamber B so as to be adjacent to the chamber B.

The chamber C has a volume equal to or greater than half of a volume of the breather space 42. The chamber A has a volume smaller than the volume of the chamber C and larger than a volume of the chamber B. The volume of the chamber B is preferably equal to or smaller than half of the volume of the chamber A. For example, the volume of the chamber A is 23% of the volume of the breather space 42, the volume of the chamber B is 6% of the volume of the breather space 42, and the volume of the chamber C is 71% of the volume of the breather space 42.

As shown in FIG. 6, the upper outer wall 32 of the cylinder head cover 15, which forms the upper outer wall of the breather chamber structure 41, extends in the horizontal direction (the left-right direction). The upper portion of the left outer wall 33 and the upper portion of the right outer wall 34 of the cylinder head cover 15, which respectively form the left and right outer walls of the breather chamber structure 41, are orthogonal to the upper outer wall 32 of the cylinder head cover 15 and are parallel to each other. Following the arrows shown under FIG. 6, the boundary wall 49, which forms the lower outer wall of the breather chamber structure 41, is inclined with respect to the horizontal direction so as to descend from a right end portion to a left end portion thereof.

The chamber A and the chamber B are partitioned by the first partition wall 51. The first partition wall 51 protrudes forward from the rear outer wall 31 of the cylinder head cover 15, and a portion where the first communication path 56 is not formed on the front end face of the first partition wall 51 is in contact with the partition plate 43. The first partition wall 51 extends from the third partition wall 53 to the left outer wall 33 of the cylinder head cover 15. Following the arrows shown under FIG. 6, the first partition wall 51 is inclined with respect to the horizontal direction so as to descend from a right end portion to a left end portion thereof.

Following the arrows shown under FIG. 6, a left end side portion 51A (a lower end side portion) of the first partition wall 51 preferably has an inclination angle that is closer to horizontal than the other portion of the first partition wall 51, or horizontal, or inclined in a direction opposite to the other portion of the first partition wall 51 with respect to the horizontal direction. In this embodiment, the left end portion 51A of the first partition wall 51 is inclined in a direction opposite to the other portion of the first partition wall 51 with respect to the horizontal direction. That is, the left end side portion 51A of the first partition wall 51 is inclined so as to rise toward the left side. The first partition wall 51 is a specific example of the first partition that forms a part of the inner wall of the breather chamber structure.

The left portion of the chamber C and the chamber B are partitioned by the second partition wall 52. The second partition wall 52 protrudes forward from the rear outer wall 31 of the cylinder head cover 15 to the partition plate 43, and extends from the third partition wall 53, which will be described later, toward the left outer wall 33 of the cylinder head cover 15, The second partition wall 52 is inclined in the same direction as the first partition wall 51. Specifically, following the arrows shown under FIG. 6, the second partition wall 52 is inclined with respect to the horizontal direction so as to descend from a right end portion to a left end portion thereof. The second partition wall 52 is a specific example of the second partition that forms a part of the inner wall of the breather chamber structure.

The right portion of the chamber C and the chamber A, and the right portion of the chamber C and the chamber B are partitioned by the third partition wall 53. The third partition wall 53 protrudes forward from the rear outer wall 31 of the cylinder head cover 16 to the partition plate 43. The third partition wall 53 extends in the upper-lower direction at a substantially central portion in the left-right direction in the breather space 42. An upper end portion of the third partition wall 53 reaches the upper outer wall 32 of the cylinder head cover 15, that is, is in contact with the outer wall 32. A lower end portion of the third partition wall 53 extends downward of the second partition wall 52 without reaching the boundary wall 49, that is, without contact with the boundary wall 49. A part of the third partition wall 53 is formed by the two spark plug accommodating portions 37 disposed on an upper portion of the cylinder head cover 15 and a reinforcing rib between the spark plug accommodating portions 37.

As shown in FIG. 4, an inlet 55 that allows the gas in the engine 3 to flow into the breather space 42 is disposed above the cylinder head cover 15. The inlet 55 is formed by an upper portion of the notch 44 of the partition plate 43. As shown in FIG. 8, the inlet 55 communicates with an upper portion of the chamber A.

A first communication path 56 that communicates between an inside of the chamber A and an inside of the chamber B is formed at a boundary between the chamber A and the chamber B. As shown in FIGS. 6 and 8, following the arrows shown under FIG. 6 or 8, the first communication path 56 is formed by notching the front end portion of the first partition wall 51 from the right end position of the first partition wall 51 to a position in the vicinity of a center portion in the left-right direction of the first partition wall 51. The first communication path 56 is an elongated hole extending leftward and downward from the third partition wall 53 between the first partition wall 51 and the partition plate 43.

A second communication path 57 that communicates between the inside of the chamber B and an inside of the chamber C is formed at a boundary between the chamber C and the chamber B. As shown in FIGS. 6 and 8, the second communication path 57 is formed by providing a gap between a left end portion of the second partition wall 52 and the left outer wall 33 of the cylinder head cover 15. The second communication path 57 may also be formed by connecting the left end portion of the second partition wall 52 to the left outer wall 33 and providing a notch or a hole in the left end portion of the second partition wall 52.

The first communication path 56 is disposed at a right portion of the boundary between the chamber A and the chamber B, whereas the second communication path 57 is disposed at a left end portion of the boundary between the left portion of the chamber C and the chamber B. Thus, the first communication path 56 and the second communication path 57 do not face each other in the upper-lower direction.

As shown in FIGS. 6 and 8, an outlet 58 that allows the gas in the breather space 42 to flow out of the breather space 42 is disposed on the upper portion of the cylinder head cover 15. Following the arrows shown under FIG. 8, the outlet 58 is formed by mounting a joint 59 in a through hole formed on the upper portion of the right outer wall 34 of the cylinder head cover 15. The outlet 58 communicates with an upper right portion of the chamber C.

The breather chamber structure 41 includes an oil discharge port 60 for discharging oil separated from the gas in the breather space 42 from the inside of the breather space 42 and returning the oil to an oil reservoir (for example, an oil pan or the like) of the engine 3. The oil discharge port 60 is disposed on a lower portion of the breather chamber structure 41. As shown in FIG. 6, following the arrows shown under FIG. 6, the oil discharge port 60 in the present embodiment is formed by a gap provided between a left end portion of the boundary wall 49, which forms the lower outer wall of the breather space 42, and the left outer wall 33 of the cylinder head cover 15. The oil discharge port 60 may also be formed by connecting the left end portion of the boundary wall 49 to the left outer wall 33 and providing a notch or a hole at the left end portion of the boundary wall 49. The boundary wall 49 is inclined so as to descend from the right outer wall 34 of the cylinder head cover 15 toward the oil discharge port 60. The oil discharge port 60 communicates with a lowermost portion of the chamber C.

In the breather chamber structure 41 having such configuration, basically as indicated by an arrow drawn in the breather chamber 42 in FIG. 6, the gas in the engine 3 first flows into the chamber A from the inlet 55, then moves from the inside of the chamber A into the chamber B through the first communication path 56, then moves from the inside of the chamber B into the left portion of the chamber C through the second communication path 57, then moves to the left portion, the lower right portion, and the upper right portion in the chamber C sequentially, and then flows out of the breather space 42 from the outlet 58.

In the breather chamber structure 41, as shown in FIG. 9, the volumes of the chamber C and the chamber A are larger than the volume of the chamber B. Therefore, when a pressure change occurs in the engine 3 (in the crank chamber, in the cam chamber communicating with the crank chamber, or the like) due to reciprocating motion of the pistons 18 of the engine 3 or the like, assuming that the temperature of the gas in the chamber A, the chamber B, and the chamber C is constant, according to Boyle's law (pressure×volume=constant), the pressure in the chamber B is higher than pressures in the chamber A and the chamber C. As a result, when the pressure in the engine 3 increases, the gas moving from the inside of the chamber A into the chamber B is compressed, and the gas moving from the inside of the chamber B into the chamber C is expanded. When the pressure in the engine 3 decreases, the gas moving from the inside of the chamber C into the chamber B is compressed, and the gas moving from the inside of the chamber B into the chamber A is expanded. The oil is separated from the gas due to compression and expansion of the gas.

In this embodiment, for example, the volume of the chamber A is 23% of the volume of the breather space 42, the volume of the chamber B is 6% of the volume of the breather space 42, and the volume of the chamber C is 71% of the volume of the breather space 42. In this case, the chamber B has a high pressure of about 3.8 times of that of the chamber A, and about 11.8 times of that of the chamber C. Thus, in a case where the volume of the chamber C is equal to or greater than half of the volume of the breather space 42 and the volume of the chamber B is equal to or smaller than half of the volume of the chamber A, the pressure in the chamber B becomes significantly higher than the pressures in the chamber A and the chamber C in response to pressure change in the engine 3 due to reciprocating motion of the piston 18. As a result, when the pressure in the engine 3 increases, the gas moving from the inside of the chamber A into the chamber B is compressed significantly, and the gas moving from the inside of the chamber B into the chamber C is expanded significantly. When the pressure in the engine 3 increases, the gas moving from the inside of the chamber C into the chamber B is compressed significantly, and the gas moving from the inside of the chamber B into the chamber A is expanded significantly. Such significant compression and expansion of the gas enhances the effect of separating the oil from the gas.

The oil separated from the gas in the breather space 42 adheres to the outer walls 31 to 34 surrounding the breather space 42, the boundary wall 49, and the first to third partition walls 51 to 53. The adhering oil flows downward due to its own weight, is discharged from the oil discharge port 60, and returns to the oil reservoir of the engine 3.

As described above, in the breather chamber structure 41 according to the embodiment of the present disclosure, the chamber C has a volume equal to or larger than half of the volume of the breather space 42, and the chamber A has a volume smaller than that of the chamber C and larger than that of the chamber B. With this configuration, compression and expansion of the gas flowing through the breather space 42 can be caused by pressure change in the engine 3 due to reciprocating motion of the pistons 18 or the like, and the effect of separating the oil from the gas can be enhanced.

According to the breather chamber structure 41 of the embodiment of the present disclosure, the chambers formed in the breather space 42 include three chambers, and the number of chambers is smaller and the number of partition walls is also smaller compared to the breather chamber as described in Patent Document 1. The breather chamber structure 41 is simple, and thus has a small number of positions having a possibility that the oil separated from the gas in the breather space 42 is stopped or accumulated. Therefore, the oil separated from the gas can smoothly flow toward the oil discharge port 60. Therefore, the oil separated from the gas and remaining in the breather space 42 can be prevented from flowing out together with the gas from the outlet 58.

By simplifying the breather chamber structure 41 as described above, it is possible to reduce the size and the weight of the breather chamber structure 41. By providing such breather chamber structure 41 having reduced size and weight in the engine 3, it is possible to reduce the size and the weight of the engine 3.

In the breather space 42 of the breather chamber structure 41 according to the embodiment of the present disclosure, the chamber B is arranged below the chamber A so as to be adjacent to the chamber A, the left portion of the chamber C is arranged below the chamber B so as to be adjacent to the chamber B, the first partition wall 51 is inclined so as to descend toward the left outer wall 33 of the cylinder head cover 15 with respect to the horizontal direction, and the second partition wall 52 is inclined in the same direction as the first partition wall 51, Due to this configuration, the gas flowing into the chamber B and increased in pressure can be guided to the left outer wall 33 of the cylinder head cover 15 by the first partition wall 51 and the second partition wall 52, and the gas can be strongly pressed against the left outer wall 33. As a result, it is possible to enhance the effect of separating the oil from the gas.

In the breather chamber structure 41 according to the embodiment of the present disclosure, the first communication path 56 and the second communication path 57 are disposed at positions that do not face each other in the upper-lower direction. Specifically, in the horizontal direction, the first communication path 56 is disposed at a right portion of the boundary between the chamber A and the chamber B, and the second communication path 57 is disposed at a left end portion of the boundary between the left portion of the chamber C and the chamber B. Due to this configuration, the gas flowing into the chamber B can flow toward the left outer wall 33 of the cylinder head cover 15, and the gas can be strongly pressed against the left outer wall 33.

In the breather chamber structure 41 according to the embodiment of the present disclosure, the left end side portion 51A of the first partition wall 51 has an inclination angle that is closer to horizontal than the other portion of the first partition wall 51, or horizontal, or inclined in a direction opposite to the other portion of the first partition wall 51 with respect to the horizontal direction. With this configuration, as indicated by the dotted arrow in FIG. 6, when the gas flows back in the breather space 42 due to a negative pressure or the like generated in the engine 3, the gas flowing from the chamber C into the chamber B can come into contact with the left end side portion 51A of the first partition wall 51. As a result, the oil can be separated from the gas flowing back.

In the breather space 42, the upper portion of the chamber C and the chamber A are arranged to be adjacent to each other in the horizontal direction, and the left portion of the chamber C is arranged below the chamber B so as to be adjacent to the chamber B. Further, the inlet 55 is arranged to communicate with the upper portion in the chamber A, and the outlet 58 is disposed so as to communicate with the upper portion in the right portion of the chamber C. Due to such configuration, a U-shaped gas flow path can be formed by the inlet 55, the inside of the chamber A, the first communication path 56, the inside of the chamber B, the second communication path 57, and the inside of the chamber C. By making the shape of the gas flow path in the U shape, the gas flow path can be elongated without increasing the size of the breather chamber structure 41. Further, by bending the gas flow path in the U shape, the gas can easily come into contact with the outer walls 31 to 34, the boundary wall 49, or the partition walls 51 to 53, and the effect of separating the oil from the gas can be enhanced.

In the breather chamber structure 41 according to the embodiment of the present disclosure, the oil discharge port 60 is arranged so as to communicate with the lowermost portion of the chamber C. Further, the boundary wall 49 is inclined so as to descend toward the oil discharge port 60. Due to such configuration, the oil in the breather space 42 can smoothly flow to the oil discharge port 60 and be discharged due to its own weight.

The breather chamber structure 41 according to the embodiment of the present disclosure is provided in the cylinder head cover 15 of the engine 3. Due to such configuration, the breather chamber structure 41 can be provided in the engine 3 while avoiding interference with other components of the engine 3. Further, by providing the breather chamber structure 41 in the cylinder head cover 15 of the engine 3 arranged such that the axis of the crankshaft 17 extends in the upper-lower direction, it is possible to easily form a structure in which the oil separated from the gas in the breather space 42 can smoothly downward flow due to its own weight.

Figure 10:
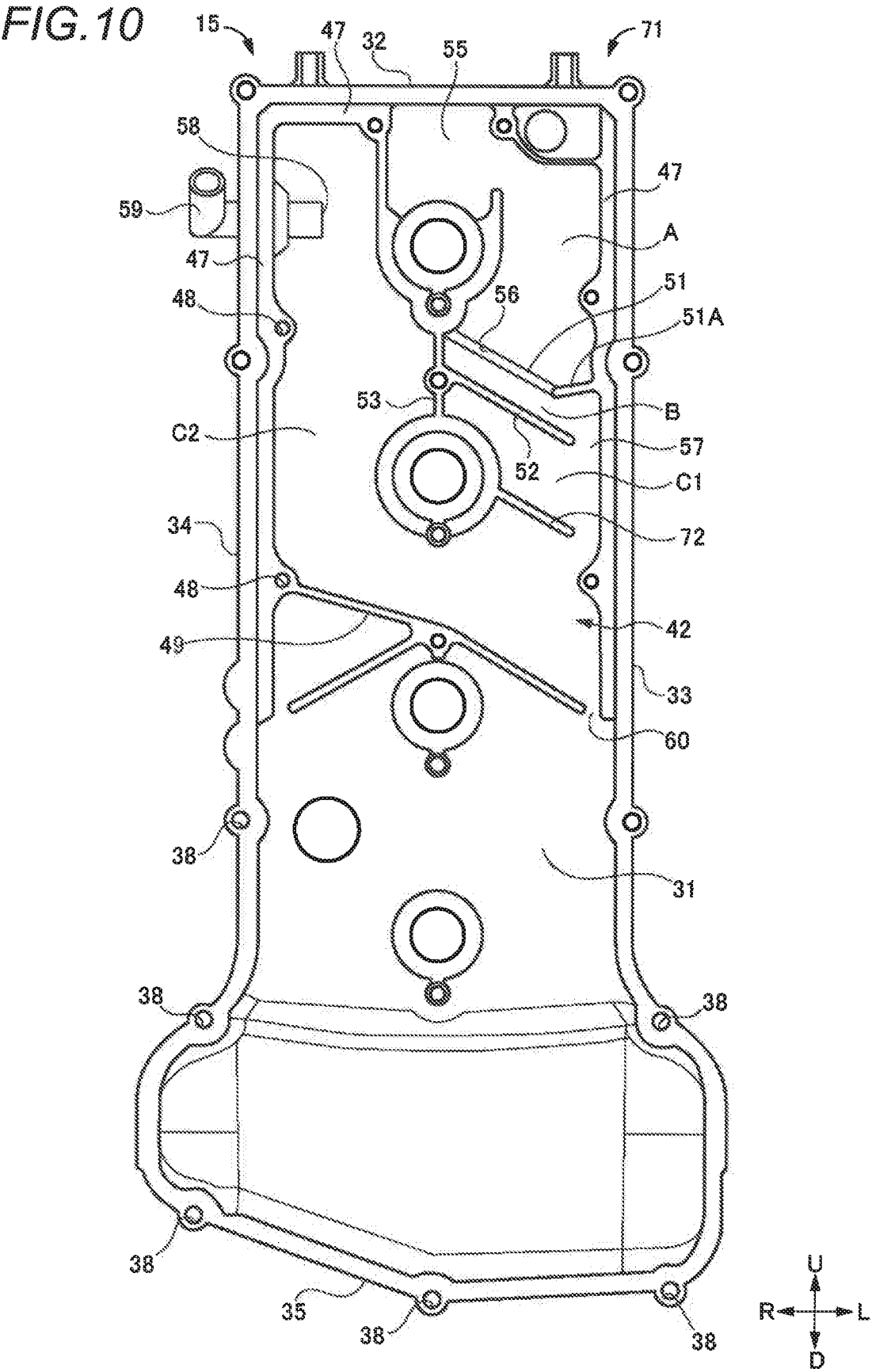
FIG. 10 is an explanatory view showing a breather chamber structure of another embodiment of the present disclosure.

The embodiment described above exemplifies a case where the breather space 42 of the breather chamber structure 41 is divided into three chambers. However, the present disclosure is not limited thereto, and the breather space of the breather chamber structure may be divided into about four or five chambers. Here, FIG. 10 shows a breather chamber structure 71 in which the breather space 42 is divided into four chambers as another embodiment of the present disclosure. In the breather chamber structure 71, the chamber C is divided into a chamber C1 and the chamber C2 by a fourth partition wall 72.

The embodiment described above exemplifies a case where the breather chamber structure 41 is provided in the engine 3 of the outboard motor 1, but the present disclosure is not limited thereto. The breather chamber structure can also be applied to engines of other devices such as a two-wheeled vehicle, a four-wheeled vehicle, and a generator.

The embodiment described above exemplifies a case where the breather chamber structure 41 is provided in the cylinder head cover 15, but the present disclosure is not limited thereto. The breather chamber structure may also be provided in a crankcase, a cylinder block, or the like.

The present disclosure can be modified as appropriate without departing from the scope or spirit of the invention which can be read from the claims and the entire specification, and the breather chamber structure and the engine with such modifications are also included in the technical idea of the present disclosure.

What is claimed is:

1. An engine comprising:
   a cylinder head cover in which a breather chamber structure configured to separate oil from gas in the engine is formed, the breather chamber structure comprising:
   front, ear; upper, lower, left and right outer walls;
   an inner wall that partitions a breather space surrounded by the outer walls into a plurality of chambers including a first chamber, a second chamber, and a third chamber; an inlet configured to allow the gas to flow into the first chamber;
   a first communication path that communicates between an inside of the first chamber and an inside of the second chamber;
   a second communication path that communicates between the inside of the second chamber and an inside of the third chamber;
   an outlet configured to allow the gas in the inside of the third chamber to flow out of the breather space; and
   an oil discharge port configured to discharge the oil separated from the gas in the breather space,
   wherein the third chamber has a volume equal to or greater than half of a volume of the breather space, and the first chamber has a volume larger than a volume of any of the plurality of chambers except for the first chamber and the third chamber,
   wherein a plurality of spark plug accommodating portions are provided in the cylinder head cover,
   wherein a reinforcing rib is formed between the plurality of spark plug accommodating portions to partition the breather space into left and right spaces,
   wherein both the first and second chambers are arranged in one of the left and right spaces, and
   wherein the third chamber is disposed so as to bridge between the left and right spaces.

2. The engine according to claim 1, wherein in the breather space,
   the second chamber is arranged below the first chamber so as to be adjacent to the first chamber,
   the third chamber is arranged below the second chamber so as to be adjacent to the second chamber,
   a first partition of the inner wall, that partitions the first chamber and the second chamber is inclined with respect to a horizontal direction, and
   a second partition of the inner wall, that partitions the second chamber and the third chamber is inclined in the same direction as the first partition.

3. The engine according to claim 2, wherein the first communication path and the second communication path are respectively arranged at positions that do not face each other in an upper-lower direction.

4. The engine according to claim 3, wherein in the horizontal direction, the first communication path is arranged on one end side of a boundary between the first chamber and the second chamber, and the second communication path is arranged on another end side of a boundary between the second chamber and the third chamber.

5. The engine according to claim 4, wherein a portion of the first partition on the another end side in the horizontal direction has an inclination angle that is closer to horizontal than the other portion of the first partition, or that is horizontal, or that is inclined in a direction opposite to the other portion of the first partition with respect to the horizontal direction.

6. The engine according to claim 2, wherein in the breather space,
   an upper portion of the third chamber and the first chamber are arranged to be adjacent in a horizontal direction, and
   a lower portion of the third chamber is arranged below the second chamber so as to be adjacent to the second chamber.

7. The engine according to claim 6, wherein the inlet is arranged to communicate with an upper portion of the first chamber, and the outlet is arranged to communicate with the upper portion of the third chamber.

8. The engine according to claim 2, wherein the oil discharge port is arranged to communicate with a lowermost portion of the third chamber.

9. The engine according to claim 1, wherein the lower outer wall is inclined so as to descend toward the oil discharge port.

* * * * *